United States Patent
Ghanbarinejad et al.

(10) Patent No.: US 10,362,586 B2
(45) Date of Patent: Jul. 23, 2019

(54) SYSTEM AND METHOD FOR SPATIAL REUSE IN DIRECTIONAL RANDOM ACCESS

(71) Applicant: Futurewei Technologies, Inc., Plano, TX (US)

(72) Inventors: Majid Ghanbarinejad, Rolling Meadows, IL (US); Diana Maamari, Rolling Meadows, IL (US); George Calcev, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 89 days.

(21) Appl. No.: 15/267,425

(22) Filed: Sep. 16, 2016

(65) Prior Publication Data

US 2017/0105224 A1 Apr. 13, 2017

Related U.S. Application Data (60) Provisional application No. 62/240,855, filed on Oct. 13, 2015.

(51) Int. Cl.
*H04W 72/08* (2009.01)
*H04L 5/00* (2006.01)
(Continued)

(52) U.S. Cl.
CPC ......... *H04W 72/085* (2013.01); *H04L 5/0055* (2013.01); *H04W 28/26* (2013.01);
(Continued)

(58) Field of Classification Search
None
See application file for complete search history.

(56) References Cited

U.S. PATENT DOCUMENTS

| | | | |
|---|---|---|---|
| 2005/0286440 A1* | 12/2005 | Strutt | H04L 47/10 370/253 |
| 2008/0153502 A1* | 6/2008 | Park | H04W 8/005 455/446 |

FOREIGN PATENT DOCUMENTS

| | | |
|---|---|---|
| CN | 102026297 A | 4/2011 |
| CN | 103067930 A | 4/2013 |

(Continued)

OTHER PUBLICATIONS

"IEEE Standard for Information technology—Telecommunications and information exchange between systems—Local and metropolitan area networks—Specific requirements—Part 11: Wireless LAN Medium Access Control (MAC) and Physical Layer (PHY) Specifications," 802.11, IEEE Computer Society, Mar. 29, 2012.

(Continued)

*Primary Examiner* — Kouroush Mohebbi
(74) *Attorney, Agent, or Firm* — Slater Matsil, LLP (57) ABSTRACT

A method for channel reservation and communication using carrier sense multiple access (CSMA) with directional antennas in a wireless network. A source station (STA) may transmit a directional request to send (RTS) frame to a destination station before a data transmission. Upon receipt of the RTS frame, the destination STA may transmit a transmit network allocation vector (TNAV) frame instructing receiving stations not to perform transmissions toward the destination STA for a predefined period of time, which may include a channel quality measurement (CQM) period. The destination STA may transmit a directional clear-to-send (CTS) frame when channel quality estimated during the CQM meets a criterion. The source STA may then transmit a directional data transmission to the destination STA upon receipt of the CTS frame.

23 Claims, 7 Drawing Sheets

(51) Int. Cl.
　　　*H04W 28/26*　　(2009.01)
　　　*H04W 72/04*　　(2009.01)
　　　*H04W 74/08*　　(2009.01)
(52) U.S. Cl.
　　　CPC ..... *H04W 72/042* (2013.01); *H04W 74/0808* (2013.01); *H04W 74/0816* (2013.01); *H04W 72/046* (2013.01)

(56) References Cited

FOREIGN PATENT DOCUMENTS

| JP | 4747646 B2 | 8/2011 |
|---|---|---|
| WO | 2008111496 A3 | 9/2008 |
| WO | 2014161496 A1 | 10/2014 |

OTHER PUBLICATIONS

"IEEE Standard for Information technology" Telecommunications and information exchange between systems—Local and metropolitan area networks—Specific requirements—Part 11: Wireless LAN Medium Access Control (MAC) and Physical Layer (PHY) Specifications—Amendment 3: Enhancements for Very High Throughput in the 60 GHz Band, 802.11ad, IEEE Computer Society, Dec. 28, 2012, 628 pgs.

\* cited by examiner

SYSTEM AND METHOD FOR SPATIAL REUSE IN DIRECTIONAL RANDOM ACCESS

This patent application claims priority to U.S. Provisional Application No. 62/240,855, filed on Oct. 13, 2015 and entitled "System and Method for Spatial Reuse in Directional Random Access," which is hereby incorporated by reference herein as if reproduced in its entirety.

TECHNICAL FIELD

The present invention relates generally to managing the allocation of resources in a network, and in particular embodiments, to techniques and mechanisms for a system and method for spatial reuse in directional random access.

BACKGROUND

Random access medium-access control (MAC) protocols, such as the distributed coordinated function (DCF) in the legacy IEEE 802.11 and the enhanced distributed channel access (EDCA) function in high-throughput (HT) IEEE 802.11, allow stations (STAs) to share the medium without deterministic coordination. Due to the possibility of transmission collisions, which is defined as the mutually destructive effect of interference at the receiver from simultaneous transmissions, random backoff mechanisms are used in random access protocols. For example, in IEEE 802.11, each STA maintains a backoff counter that is decremented in every slot that the STA senses the medium to be idle. The counter decrement is paused if the medium is sensed to be busy. When the counter's value becomes zero, the STA (re)transmits its frame. The backoff counter is randomly uniformly selected from a range called the backoff window. This window is doubled, up to a certain maximum, every time the STA experiences a reception failure determined by lack of an acknowledgement (ACK) frame in response to its data frame transmission. In IEEE 802.11, the STA resets the backoff window to the minimum backoff window every time it transmits the data frame and receives the corresponding ACK frame successfully.

SUMMARY OF THE INVENTION

Technical advantages are generally achieved, by embodiments of this disclosure which describe a system and method for spatial reuse in directional random access.

In accordance with an embodiment, a method for channel reservation and communication using carrier sense multiple access (CSMA) with directional antennas in a wireless network is provided, as may be performed by a destination station. In this example, the method includes receiving a directional request to send (RTS) frame from a source station, and transmitting a transmit network allocation vector (TNAV) frame upon receipt of the directional RTS frame. The TNAV frame instructs receiving stations not to perform transmissions toward the destination station for a predefined period of time, and the predefined period of time includes a channel quality measurement (CQM) period. The method further includes estimating quality of a channel between the destination station and the source station during the CQM period, and transmitting a directional clear-to-send (CTS) frame to the source station if the estimated quality of the channel satisfies a criterion. An apparatus for performing this method is also provided.

In accordance with another embodiment, a method for spatial reuse in carrier sense multiple access (CSMA) with directional antennas in a wireless network is provided, as may be performed by a station. In this example, the method includes receiving a transmit network allocation vector (TNAV) frame from a destination station. The TNAV frame identifies the destination station and identifies a directional network allocation vector (NAV) period. The method further includes refraining from performing directional transmissions in a transmit direction associated with the destination station for a duration of the directional NAV period.

In accordance with yet another embodiment, a method for spatial reuse in carrier sense multiple access (CSMA) with directional antennas in a wireless network is provided, as may be performed by a source station. In this example, the method includes transmitting a directional request to send (RTS) frame to a destination station, and receiving a transmit network allocation vector (TNAV) frame from the destination station. The TNAV frame instructs the source station not to perform transmissions toward the destination station for a period of time, and the period of time includes a channel quality measurement (CQM) period. The method further includes receiving a directional clear-to-send (CTS) frame from the destination station, and performing a directional data transmission to the destination station upon receipt of the CTS frame if a criterion is satisfied.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In modern wireless networks, carrier-sense multiple access (CSMA)-based access functions have well-known issues, such as the hidden-node problem and the exposed-node problem. The hidden-node problem occurs when a station (STA) does not sense the medium to be busy because, for example, it is far from the transmitter, while it is sufficiently close to the receiver to cause a collision. The exposed-node problem occurs when the STA is, for example, close to the transmitter and far from the receiver, in which case the STA can safely transmit its data, but refrains from transmitting because it senses the medium to be busy.

A solution proposed by IEEE 802.11 to overcome the hidden-node problem, and possibly the exposed-node problem, is the exchange of request-to-send (RTS) and clear-to-send (CTS) frames prior to data communications. The RTS frame sent by the source STA informs other STAs that there will be upcoming data transmissions by the source STA. The CTS frame sent by the destination STA will inform the hidden STAs about the possibility of collisions so that the STAs back off for a certain period of time. The short inter-frame space (SIFS) is a fixed duration defined by the standard that is to account for the propagation delay, the transmit/receive turnaround delay, the processing delay, etc. The source STA and the destination STA may be referred to as peer STAs herein.

With directional medium access control communications, additional problems such as "deafness" may appear. Deafness occurs when an intended destination STA is unable to receive a frame because it is listening to or in another direction. This may be interpreted as a collision by the source STA, which results in unnecessarily doubling the backoff window.

Disclosed herein is an embodiment signaling scheme that uses a transmit network allocation vector (TNAV frame) frame to address the deafness problem when directional transmissions (e.g., directional RTS and/or CTS frames, etc.) are used to preserve and/or access a carrier sense multiple access (CSMA) channel. A source station may transmit a RTS frame to a destination station before a data transmission. Upon the receipt of the RTS frame, the destination station may transmit a TNAV frame instructing receiving stations not to perform transmissions toward the destination station for a predefined period of time. The TNAV frame may be transmitted omnidirectionally, or directionally in a direction or in multiple directions other than a receive direction associated with the source station. The predefined period of time may include a channel quality measurement (CQM) period when quality of a channel between the destination station and the source station may be estimated by the destination station. The destination station may transmit a CTS frame when the estimated channel quality exceeds a first signal to noise (SNR) threshold. The source station may also estimate quality of the channel during the CQM period. Upon the receipt of the CTS frame, the source station may perform a directional data transmission to the destination station if a criterion is satisfied, such as when the channel quality estimated by the source station exceeds a second SNR threshold. A STA other than the source station or the destination station may also receive the TNAV frame and refrain from performing directional transmissions in a transmit direction associated with the destination station for the predefined period of time.

Figure 1:
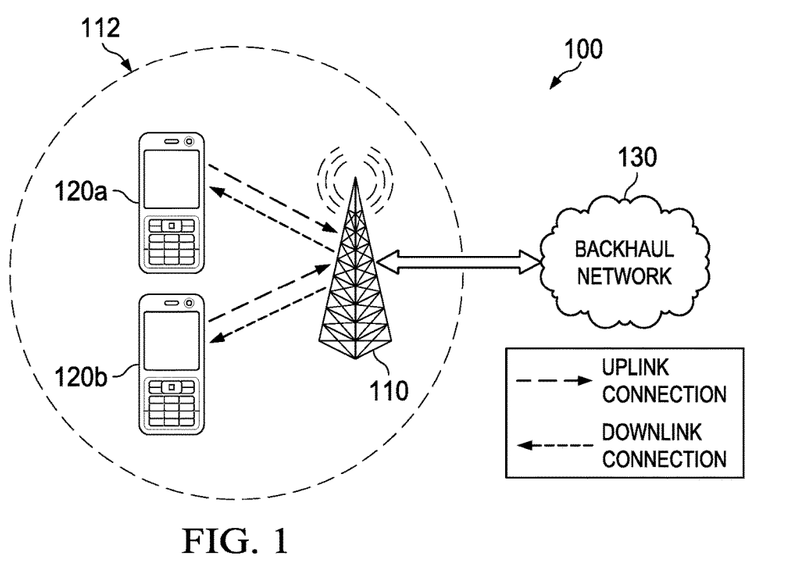
FIG. 1 illustrates a diagram of an embodiment wireless communications network.

FIG. 1 illustrates a network 100 for communicating data. The network 100 comprises a base station 110 having a coverage area 112, a plurality of mobile devices 120 (i.e., 120a, 120b), and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
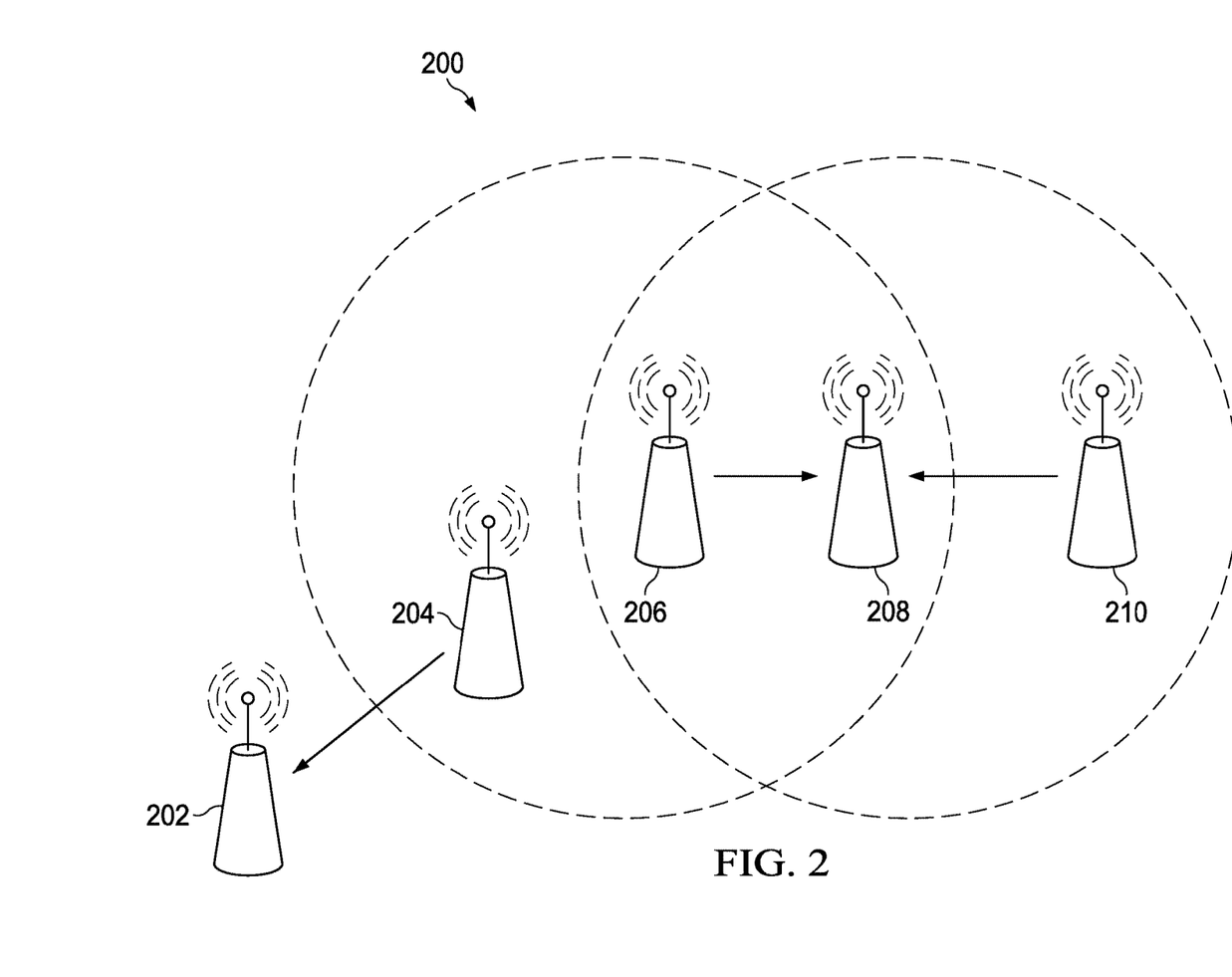
FIG. 2 illustrates a diagram of a data transmission problem in a wireless network.

As noted above, hidden-node and exposed-node problems may occur in CSMA networks. FIG. 2 illustrates a diagram of how the hidden-node and exposed-node problems occur in a CSMA network 200. In this example, a source STA 206 is transmitting data to a destination STA 208. The hidden node problem may occur when another STA 210 that is outside of a transmission range of the source STA 206 fails to sense that the medium is busy, and also transmits data to destination STA 208, thereby causing a collision. The exposed node problem may occur when a STA 204 (referred to as an exposed node) wishing to transmit data to a different destination STA 202 senses the transmission of the source STA 206, and unnecessarily refrains from transmitting data to the destination STA 202.

A solution proposed by IEEE 802.11 to overcome the hidden-node problem, and possibly the exposed-node problem, is the exchange of request-to-send (RTS) and clear-to-send (CTS) frames prior to data communications. The RTS frame sent by the source STA informs other STAs that there will be upcoming data transmissions by the source STA. The CTS frame sent by the destination STA will inform the hidden STAs about the possibility of collisions so that the STAs back off for a certain period of time. The short inter-frame space (SIFS) is a fixed duration defined by the standard that is to account for the propagation delay, the transmit/receive turnaround delay, the processing delay, etc. The source STA and the destination STA may be referred to as peer STAs herein.

Figure 3:
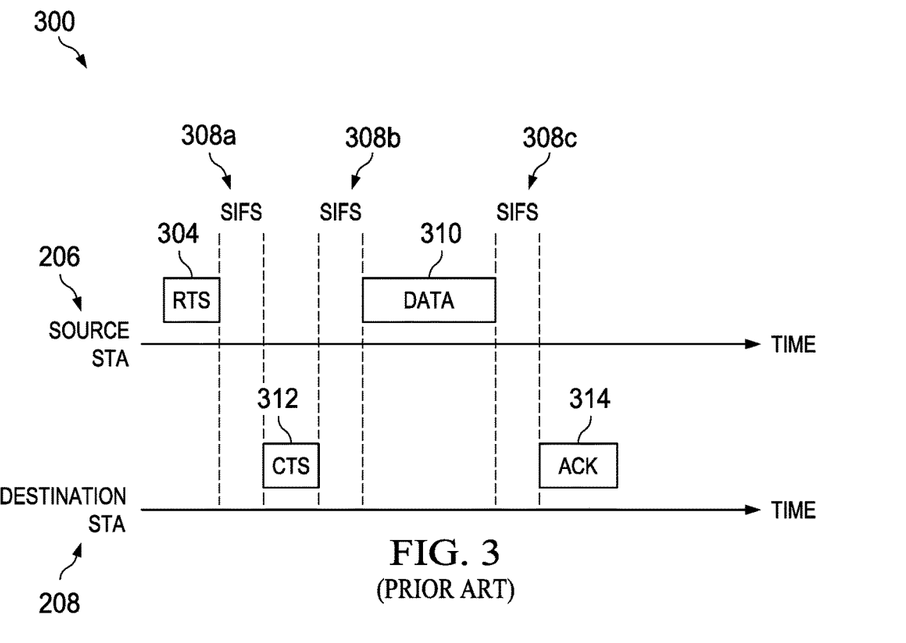
FIG. 3 illustrates a diagram of a conventional RTS/CTS signaling process in a wireless network.

IEEE 802.11ad addresses the hidden node problem by exchange of request-to-send (RTS) and clear-to-send (CTS) frames prior to data communications. FIG. 3 illustrates a conventional communications sequence 300 for accessing a CSMA communications channel. A RTS frame 304 sent by the source STA 206 may inform other STAs that there will be upcoming data transmissions by the source STA 206. The CTS frame 312 sent by the destination STA 208 may inform hidden STAs about the possibility of collisions so that the hidden STAs may back off for a certain period of time. The short inter-frame space (SIFS) 308*a*, 308*b*, or 308*c* may be a fixed duration defined by the standard that is to account for the propagation delay, the transmit/receive turnaround delay, the processing delay, etc. A data frame 310 may be transmitted by the source STA 206 after receipt of the CTS 312 at the source STA 206, and an acknowledgement frame 314 may be transmitted by the destination STA 208 after receipt of the data frame 310 at the destination STA 208.

Figure 4:
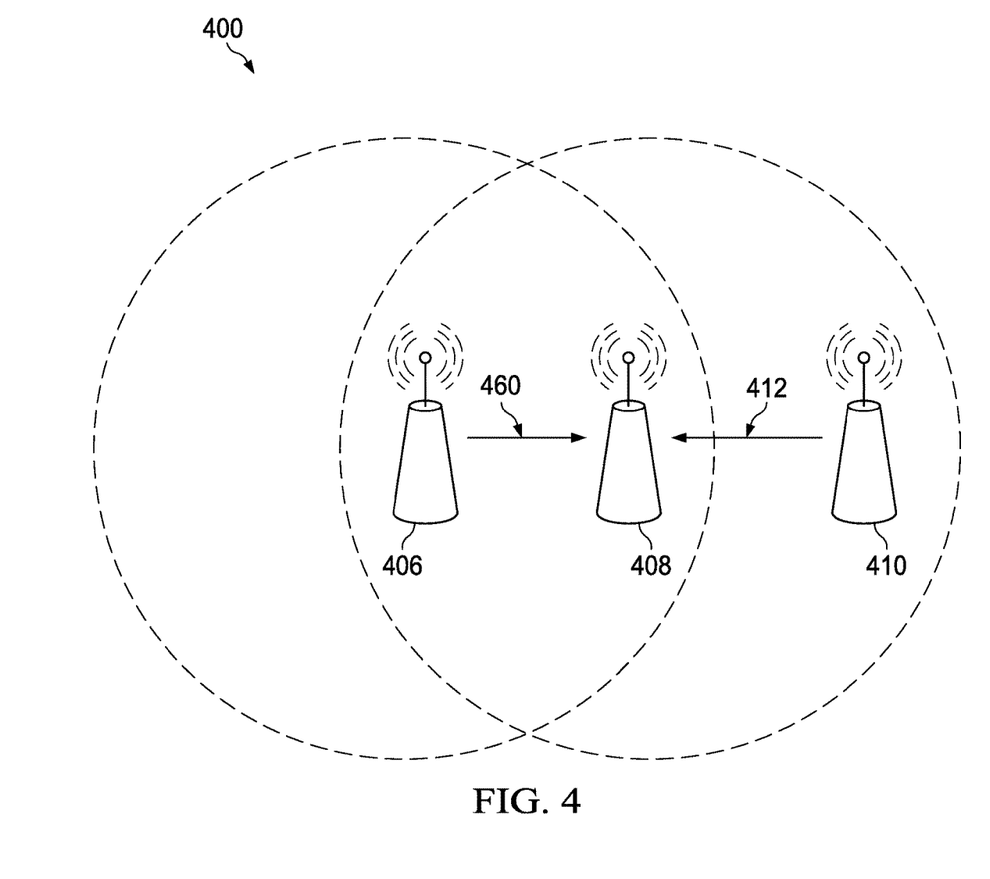
FIG. 4 illustrates a diagram of another data transmission problem in a wireless network.

When directional RTS and/or CTS frames are used to access a CSMA communications channel, an additional deafness problem may occur. FIG. 4 illustrates a diagram of how the deafness problem occurs in a CSMA network 400. The deafness problem occurs when a destination STA 408 listens directionally to a transmission 460 from a source STA 406, and fails to detect a frame 412, e.g. a directional RTS frame or a directional data frame, from the STA 410. As a result, the STA 410 does not receive a corresponding CTS frame or an acknowledgement frame from the destination STA 408, which may cause it to assume that a collision has happened and back off unnecessarily.

In order to address the deafness problem, a transmit network allocation vector (TNAV) frame is used between directional RTS and directional CTS frames. Also, after the TNAV frame, a channel quality measurement (CQM) period may be used to estimate quality of a channel between the destination STA and a source STA.

The TNAV frame may be a new frame that is distinguished by its frame identifier fields (e.g., Type and Subtype fields in IEEE 802.11). The TNAV frame may be transmitted omnidirectionally. Alternatively, the TNAV frame may be transmitted directionally in one or more transmit directions that are different than a receive direction associated with the source STA. The TNAV frame may include a Duration field, a receiver address (RA) field, and/or a transmit address (TA) field. The Duration field may determine the total duration of the upcoming data communications, including transmission of data and ACK frames. The TA field, if present, may determine the address of the STA transmitting the frame. The RA field may determine the address of the STA receiving the frame. The TNAV frame may instruct receiving stations not to perform transmissions toward the destination STA for a predefined period of time associated with the Duration field, and the predefined period of time may include a channel quality measurement (CQM) period. The TNAV frame may inform the peer STA that the link is operational. The TNAV frame may also set a second time period associated with a hidden node, for example by storing the second time period in a second Duration field.

During the CQM period, the destination STA may measure quality of the channel towards the direction of the upcoming data communications and, possibly, towards any other direction(s) it deems necessary or useful. The additional directions may depend on the history of previous communications, the specific use case or setup, or other parameters. During this period, the destination STA may perform directional channel measurement thus enabling spatial sharing for contention-based access. The duration of CQM time may be determined by the destination STA and may depend on the criteria that channel measurement is desired to satisfy. The duration may be chosen to be at least as long as the maximum amount of time needed to transmit either an RTS frame plus a SIFS, a TNAV frame plus a SIFS, or a CTS frame plus a SIFS. This choice may allow the destination STA to make sure a channel reservation is not in progress in the desired direction(s) through the RTS/TNAV/CTS signaling scheme. In another embodiment, the duration of CQM may depend on the traffic type. For example, for a traffic type with a higher priority, the CQM period may be chosen shorter; for a traffic type with a lower priority, the CQM period may be chosen longer. The source STA, the destination STA, or both may take advantage of the CQM period to estimate quality of the channel between the source STA and destination STA.

The destination STA may determine a received signal power of the directional RTS frame received before the CQM period, listen for interference using a directional antenna pattern during the CQM period, and/or estimate the channel quality according to a ratio between the received signal power of the directional RTS frame and the interference measured during the CQM period. The destination STA may determine whether or not to transmit a CTS frame to the source STA based on whether a criterion is satisfied, for example the estimated channel quality.

The source STA may determine a received signal power of the TNAV frame. The TNAV frame may have been received prior to the CQM period. The source STA may listen for interference using a directional antenna pattern during the CQM period and estimate the channel according to a ratio between the received signal power of the TNAV frame and the interference measured during the CQM period. In an example, the source STA may perform multiple measurements in different directions and/or with different beam-widths. Different directions or beam-widths may be given different weights in terms of determining channel quality. Then the results may be collectively used to estimate the channel quality. The source STA may transmit data to the destination STA when a criterion or multiple criteria are satisfied. For example, the source STA may perform a directional data transmission when the estimated channel quality exceeds a predefined threshold, after the source STA optimizes its data transmission with other directions to other destination STAs, when another criterion is satisfied, or any combination thereof.

Figure 5:
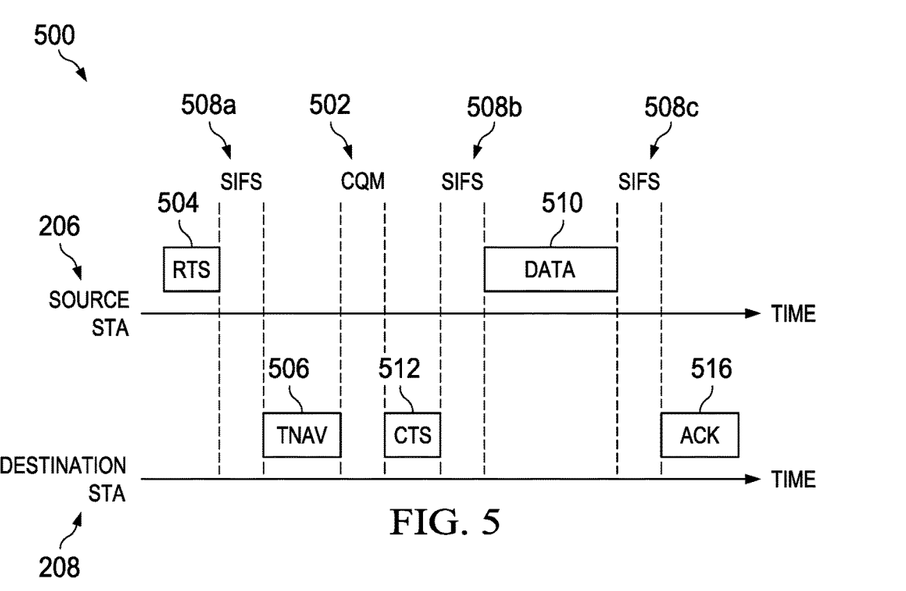
FIG. 5 illustrates a diagram of an embodiment RTS/TNAV frame/CTS process in a wireless network.

FIG. 5 illustrates an embodiment communications sequence 500 for accessing a CSMA communications channel. The Duration fields that each of the signaling frames such as a RTS frame 504, a TNAV frame 506, and a CTS frame 512, contains may be used by STAs for setting network allocation vectors (NAVs) as follows: The RTS frame 504 Duration field sets NAV to the end of a corresponding ACK frame 516 transmission. The TNAV frame 506 Duration field sets NAV to the end of a corresponding CTS frame 512 transmission. The CTS frame 512 Duration field sets NAV to the end of the ACK frame 516 transmission.

In an embodiment, a transmitter and a receiver may take several steps to assure that the channel is idle before transmission. Some of the steps described below may be performed in a different order or be omitted in different embodiments. For example, if a directional network allocation vector (NAV) of a STA 206 toward a transmit direction is zero, the source STA 206 may listen to the transmit direction. Alternatively, if a STA 206 the omnidirectional network allocation vector (NAV) and all directional NAVs of the source STA 206 are zero, the source STA 206 may listen omnidirectionally. If the medium is clear, the source STA 206 may send a directional RTS frame 504 to a destination STA 208, for example in a beamformed transmission. The medium may be considered clear by the source STA 206 when quality of the channel exceeds a signal to noise (SNR) threshold. The directional RTS frame 504 may be transmitted in one specific direction or in multiple specific directions simultaneously. The directional RTS frame 504 may contain an indication to identify itself as a directionally transmitted frame.

The destination STA 208 may listen omnidirectionally as it may not necessarily expect frames from any specific direction. When the destination STA 208 receives the directional RTS frame 504, and if the omnidirectional NAV and a directional NAV toward the source STA 206 are zero, the destination STA 208 may respond with an omnidirectional TNAV frame 506, informing STAs around it that the destination STA 208 will be possibly "deaf" for a certain period of time.

The destination STA 208 may listen (i.e., senses the channel) directionally towards the source STA 206 for a period determined by the channel quality measurement (CQM) 502 period to make sure the upcoming communications will not collide with other ongoing transmissions. If the destination STA 208 senses the medium clear, the destination STA 208 may send a CTS frame 512 directionally to the source STA 206. The CTS frame 512 may inform the source STA 206 that the destination STA 208 has received the RTS frame 504 and, hence, that the link is operational. The CTS frame 512 may also inform the source STA 206 that the medium is idle and ready for data transmission. The CTS frame 512 may also request other neighboring STAs to remain silent for a certain duration determined by the Duration field to allow data transmissions. The source STA 206 may send data frame(s) 510 directionally to the destination STA 208 upon receipt of the CTS frame 512. And the destination STA 208 may send ACK frame(s) 516 or block acknowledgment (BA) frame(s) directionally to the source STA 206.

It should be noted that a STA may maintain multiple directional NAVs, each corresponding to a beamformed transmit direction. For example, a STA may maintain four directional NAVs, each corresponding to a transmit direction that covers ninety degrees in space.

In an embodiment, the order of the above steps may be changed. For instance, the destination STA 208 may first transmit an omni-directional TNAV frame and then a directional CTS frame to the source STA 206.

In another embodiment, the source STA 206 and the destination STA 208 may send their TNAV frame(s) after the RTS-CTS handshake staggered in time. For instance, first the destination STA 208 may send a TNAV frame omnidirectionally after transmitting a directional CTS frame, and then the source STA 206 may send a TNAV frame omnidirectionally. In a different embodiment, one or both of the above TNAV frame transmissions may be skipped. In another embodiment, a TNAV frame may be transmitted by a STA only to the STA's deafness direction as opposed to omnidirectional transmission, and sets the NAV to the end of transmission of a CTS transmission. The deafness direction may be the omnidirectional transmission minus the intended transmit direction to the peer STA. In this case, the TNAV frame may be transmitted in a series of directional transmissions in different directions other than the intended transmit direction to the peer STA. The potential advantage may be an increased transmit range since multiple directional TNAV frames may be transmitted to cover the deafness direction.

An additional embodiment may involve transmission of a TNAV frame by both the source STA and the destination STA simultaneously, but in different directions so as to avoid collisions. In particular, the source STA and the destination STA may transmit TNAV frames in their deafness directions (instead of omnidirectionally) to avoid collision and to inform other STAs that they will be possibly deaf for a predefined period of time. The TNAV frames may then be followed by CQM time during which directional channel sensing may be performed by the destination STA. If the destination STA senses the medium to be clear, the destination STA may transmit a directional CTS. The source STA may then transmit its data frame directionally after a SIFS time period has elapsed to the destination STA. The data transmission may be a beamformed data transmission that is received by the destination STA using a directional antenna pattern. This may be followed by a directional ACK transmitted by the destination STA.

It should be noted that despite the channel quality measurement during the CQM period, it may still be possible for data communication between STAs other than the source STA and destination STA, for example a first STA and a second STA. This data communication may not be heard by the destination STA. In this case, the destination STA may send a CTS frame to the source STA, and then the source STA and the destination STA may exchange data and ACK frames directionally. The data frames exchanged by the source STA and destination STA may possibly collide with the ACK frame from the second STA to the first STA. However, the ACK frame may eventually be successfully received by the first STA, because ACK frames are generally transmitted at a low rate that can combat the interference caused by high-rate data communications between the source STA and the destination STA.

If a STA receives an RTS frame while listening omnidirectionally, it may choose to set an omnidirectional NAV and refrain from transmitting to any direction. Alternatively, STAs with directional antennas may choose to selectively postpone transmitting to, and/or block reception from, the directions corresponding to the directional NAVs they set if they are capable of distinguishing between different directions when receiving RTS, TNAV, or CTS frames. For example, if the STA is able to estimate the direction from which it has received the RTS, the STA may instead choose to set a directional NAV corresponding to that direction and perform a backoff only if the data is intended to a direction that includes the direction corresponding to the directional NAV. That is, if the STA's data are to be transmitted omnidirectionally, to the same direction as the blocked direction, or to any direction that fully or partially overlaps with the blocked direction(s). Selective directional blocking may also include not listening to the blocked directions for the purpose of improving spatial reuse in the case that other STAs may have data to transmit to the subject STA.

In a different embodiment, a directional signaling frame may include an indication field, for instance, a bit or a sector identifier, to identify itself as a directional frame. A STA receiving this directional signaling may then identify the received frame as directional and may set a directional-transmission NAV for the specified duration of the transmission. This directional-transmission NAV may be used by STAs to assess the interference contributed by the upcoming transmissions in the vicinity and to decide whether to proceed with their own transmissions or to postpone their transmissions for a certain duration.

Control frames in IEEE 802.11 may reach longer distances in space because they are transmitted at a lower rate, increasing the link budget. Furthermore, directional antennas may concentrate the transmission power in a certain direction, which may result in larger link budget and consequently larger reception range, provided the transmit power is fixed. These phenomena are discussed below.

RTS/TNAV/CTS frames that reach larger reception ranges, in general, may protect data transmissions by allowing a larger error margin at the cost of reducing spatial reuse. In other words, some STAs may possibly become silent as a result of the signaling that could safely transmit their data without interference with the subject transmissions. This phenomenon may be controlled by adjusting the transmit power of the control frames. If the transmit power of the control frames is reduced to reduce the error margin, better spatial reuse may be obtained at the cost of increasing the probability of collisions.

In an embodiment signaling method, RTS and CTS may be transmitted directionally while the TNAV frame transmission may be omnidirectional. This may cause a difference in the resulting link budget and reception range that possibly disrupts the expected behavior of the protocol. For example, there may be STAs that are subject to receiving TNAV frame and CTS frames, but do not receive TNAV frame. As a result, the STAs may start transmissions during the CQM period, contradicting with the goal of the CQM period as for the destination STA to measure the interference only from ongoing transmissions and not to allow new transmissions to start and cause additional interference during the measurement process.

Figure 6:
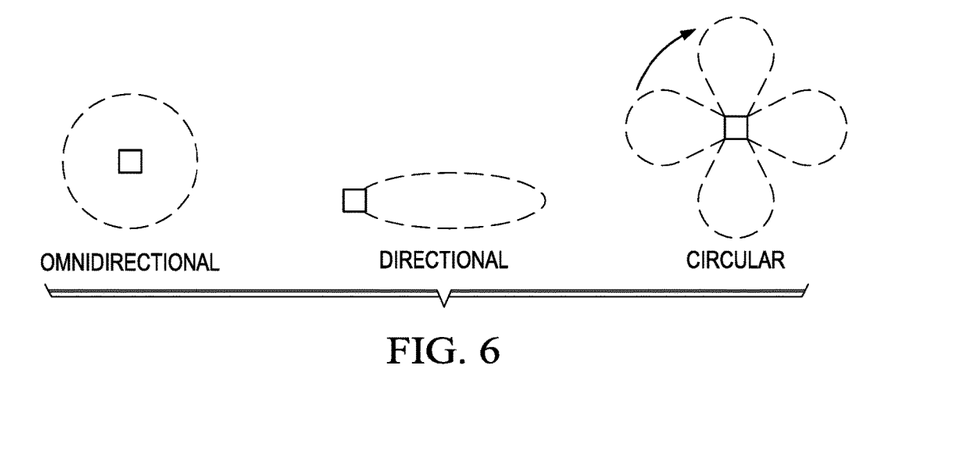
FIG. 6 illustrates a diagram of three embodiment signaling transmission schemes.

There may be two possible solutions to this issue. Power control may be used to adjust the reception range and to compensate for link budget differences. However, this may entail a transmit power for a TNAV frame that violates regulations. Furthermore, accurate transmit power control may be required for this approach, which may impose undesired implementation complexities. In this case, the power value may be comprised in the transmitted frame to allow receiving STAs to estimate the path loss and eventually schedule their transmissions. Alternatively, instead of transmitting a TNAV frame omnidirectionally, the TNAV frame may be transmitted directionally multiple times, each time to a different direction, as shown in FIG. 6. This method is referred to as "circular" transmission, as the STA may span a circle of sectors or beams to cover all spatial directions.

Figure 7:
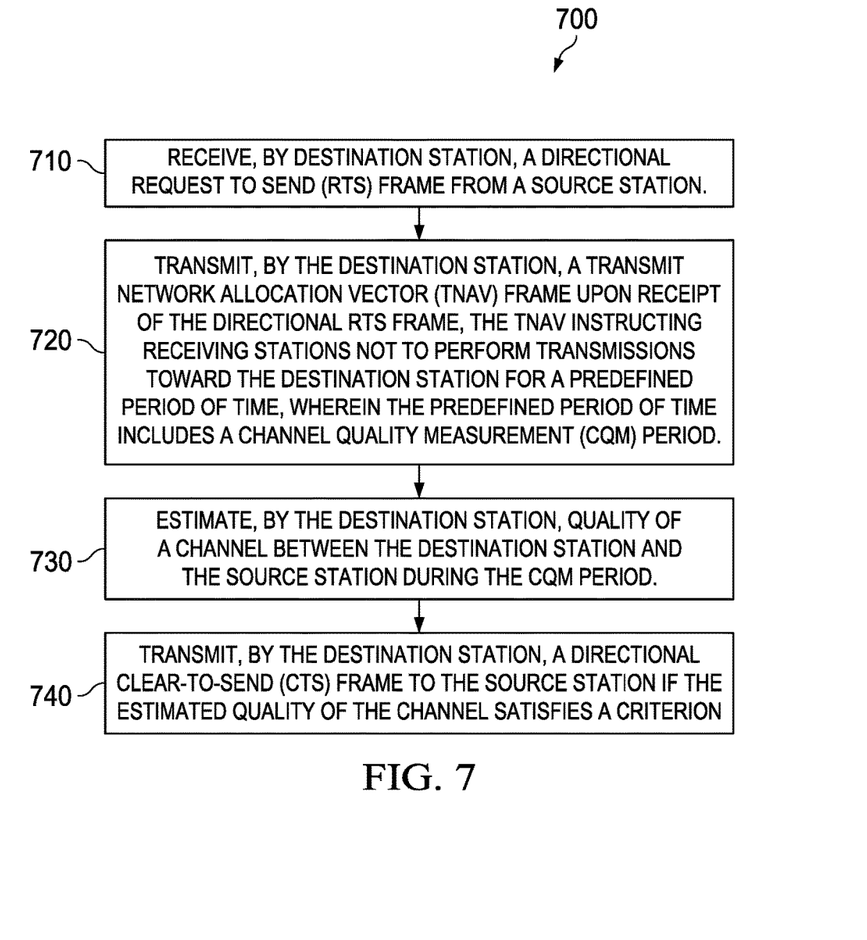
FIG. 7 illustrates a flowchart of an embodiment method for channel reservation and communication using carrier sense multiple access (CSMA) with directional antennas in a wireless network.

FIG. 7 illustrates an embodiment method 700 for channel reservation and communication using carrier sense multiple access (CSMA) with directional antennas in a wireless network, as may be performed by a destination station. As shown, the method 700 begins at step 710, where a directional request to send (RTS) frame is received by a destination station from a source station. Thereafter, the method 700 proceeds to step 720, where a transmit network allocation vector (TNAV frame) frame is transmitted by the destination station upon receipt of the directional RTS frame. The TNAV frame may instruct receiving stations to not perform transmissions toward the destination station for a predefined period of time. The predefined period of time may include a channel quality measurement (CQM) period. Subsequently, the method 700 proceeds to step 730, where quality of a channel between the destination station and the source station is estimated by the destination station during the CQM period. Subsequently, the method 700 proceeds to step 740, where a directional clear-to-send (CTS) frame is transmitted by the destination station to the source station if the estimated quality of the channel satisfies a criterion.

Figure 8:
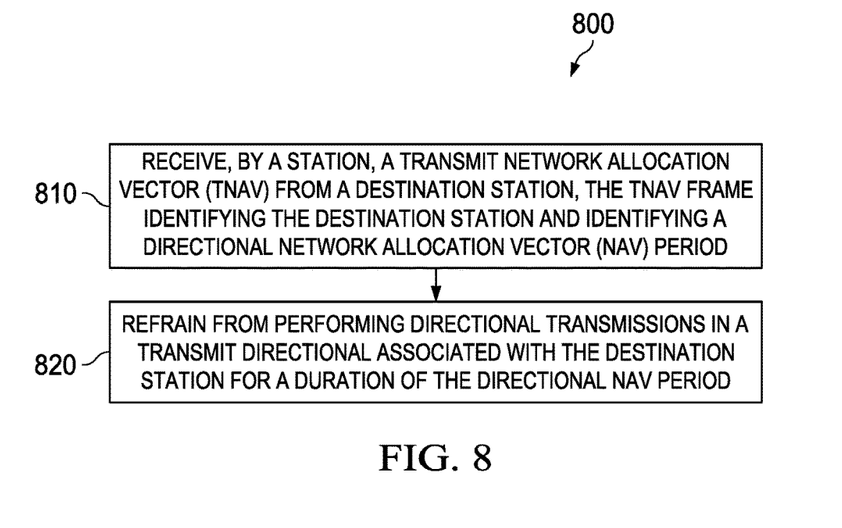
FIG. 8 illustrates a flowchart of an embodiment method for spatial reuse in carrier sense multiple access (CSMA) with directional antennas in a wireless network.

FIG. 8 illustrates an embodiment method 800 for spatial reuse in carrier sense multiple access (CSMA) with directional antennas in a wireless network, as may be performed by a STA other than a destination station or a source station. As shown, the method 800 begins at step 810, where a transmit network allocation vector (TNAV frame) frame from a destination station is received by a station. The TNAV frame may identify the destination station and may identify a directional network allocation vector (NAV) period. Thereafter, the method 800 proceeds to step 820, where the STA is refrained from performing directional transmissions in a transmit direction associated with the destination station for a duration of the directional NAV period.

Figure 9:
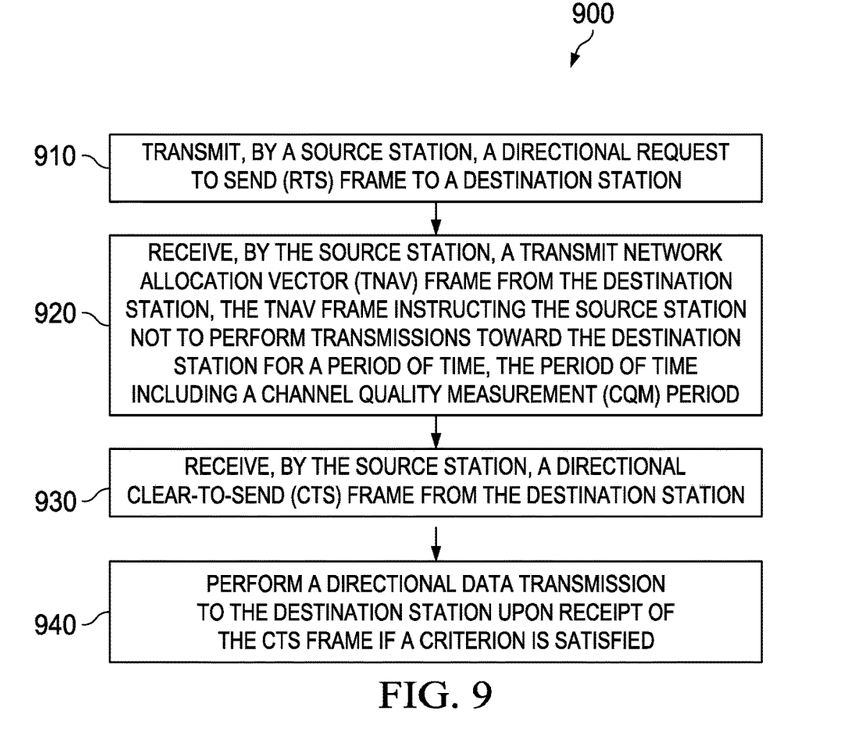
FIG. 9 illustrates a flowchart of another embodiment method for spatial reuse in carrier sense multiple access (CSMA) with directional antennas in a wireless network.

FIG. 9 illustrates an embodiment method 900 for spatial reuse in carrier sense multiple access (CSMA) with directional antennas in a wireless network, as may be performed by a source station. As shown, the method 900 begins at step 910, where a directional request to send (RTS) frame is transmitted by a source station to a destination station. Thereafter, the method 900 proceeds to step 920, where a transmit network allocation vector (TNAV) frame from the destination station is received by the source station. The TNAV frame may instruct the source station to not perform transmissions toward the destination station for a period of time. The period of time may include a channel quality measurement (CQM) period. Subsequently, the method 900 proceeds to step 930, where a directional clear-to-send (CTS) frame from the destination station is received by the source station. Subsequently, the method 900 proceeds to step 940, where a directional data transmission is performed to the destination station upon receipt of the CTS frame if a criterion is satisfied.

The behavior of other STAs may affect the above signaling between the source STA and the destination STA. Any STA other than the source STA and the destination STA may or may not be interested in transmitting data to the source STA or to the destination STA. The link from a third STA to the source STA or to the destination STA may be a beamformed link, which can be called STA directed. Alternatively, the link from the third STA to the source STA or the destination STA may be an omnidirectional link. Similarly, the source STA (S) or the destination STA (D) may be directed towards the third STA during their communications, which can be called S/D directed. Alternatively, the source STA or the destination STA may not be directed towards the third STA. The following table summarizes the status of a third STA with regard to either the source STA or the destination STA, providing that the third STA is within the communication range of either the source STA or the destination STA.

| Acronym | Interested? | STA directed? | S/D directed? |
|---------|-------------|---------------|---------------|
| IDD     | Yes         | Yes           | Yes           |
| IDO     | Yes         | Yes           | No            |
| IOD     | Yes         | No            | Yes           |
| IOO     | Yes         | No            | No            |
| UDD     | No          | Yes           | Yes           |
| UDO     | No          | Yes           | No            |
| UOD     | No          | No            | Yes           |
| UOO     | No          | No            | No            |

For example, a third STA that is IDO with respect to (w.r.t.) the source STA is interested in sending a frame to the source STA and is beamformed towards the source STA, but the source STA is not beamformed towards the third STA when communicating with the destination STA. This is an example where the source STA is deaf to communication from the third STA if not listening omnidirectionally.

As another example, when a third STA is UOO w.r.t. the destination STA, the third STA is not interested in sending data to the destination STA, and the third STA may cause a collision at the destination STA when it is transmitting omnidirectionally and the destination STA is receiving omnidirectionally.

Since each STA may be in any of the 9 possible states with respect to either the source STA or the destination STA (8 states listed plus "None" when the STA is out-of-range), there may be a maximum of 81 different states that any STA may have w.r.t. the source-destination STA pair. The status may be denoted as, for example, None/UDD, which means that the STA is out of the range of the source STA but UDD w.r.t. the destination STA. This is an example of the hidden-node situation.

Constraining any STA to be interested in at most one of the source STA or the destination STA and neglecting the None/None state, the number of states may be reduced to 64. These states and the signaling to reduce the chance of collisions will be discussed assuming that RTS, TNAV, and CTS frames are short frames sent with a low rate and therefore are unlikely to collide with other control frames and will be received successfully despite interference, provided that the intended receiver is listening to the transmitter at the time, either omnidirectionally or directionally. The wild card X may be replaced by any letter that results in a state allowed according to the above constraints hereinafter.

IXD/XXX and IXD/None: The STA may receive the directional RTS (DRTS) and avoid collisions throughout the source STA-destination STA communications. The STA may set a (directional) NAV and refrain from transmitting to the source STA for the corresponding duration, but it may still choose to continue contention for transmissions to other directions.

UXD/XXX and UXD/None: The STA may receive the directional RTS (DRTS) and avoid collisions throughout the source STA-destination STA communications. The STA may maintain a directional NAV and may still choose to continue contention for transmissions to other directions.

IXO/XXX and IXO/None: The STA may receive the omnidirectional TNAV frame (OTNAV frame) and perform the proper backoff until the end of transmission of the directional CTS (DCTS). In a different embodiment, in order to inform the interested STA to continue backoff until the end of data transmissions, the source STA may choose to transmit an OTNAV frame right before directionally transmitting the data frame, in order to inform STAs around it that it will be possibly deaf for a certain duration. The OTNAV frame may set the NAV to the end of the ACK frame. This may introduce additional signaling compared to the embodiment shown in FIG. 5.

IXO/None: The STA may start transmitting to the source STA while the source STA is listening to another direction. In a different embodiment, in order to resolve this deafness issue, the source STA may choose to transmit an OTNAV frame right before transmitting a RTS frame in order to inform STAs around it that it will be possibly deaf for a certain duration. The OTNAV frame may set the NAV to the end of the RTS frame transmission. This may introduce additional signaling compared to the embodiment shown in FIG. 5.

XXX/IXD and None/IXD: The STA may receive an OTNAV frame and a DCTS frame from the destination STA and avoid collisions throughout the source STA-destination STA communications. The STA may set a NAV and refrain from transmitting to the source STA for the corresponding duration, but it may still choose to continue contention for transmissions to other directions.

XXX/UXD and None/UXD: The STA may receive an OTNAV frame and a DCTS frame from the destination STA and avoid collisions throughout the source STA-destination STA communications. The STA may still choose to continue contention for transmissions to other directions.

XXX/IXO and None/IXO: The STA may receive an OTNAV frame from the destination STA about the upcoming deafness of the destination STA and refrain from transmitting to the destination STA. However, it may not be informed of the deafness of the destination STA during source STA-destination STA communications. In a different embodiment, in order to address this issue, the destination STA may choose to transmit an OTNAV frame right before transmitting an omnidirectional CTS frame to inform STAs around it that it will be possibly deaf for a certain duration. This may introduce additional signaling compared to the embodiment shown in FIG. 5.

Figure 10:
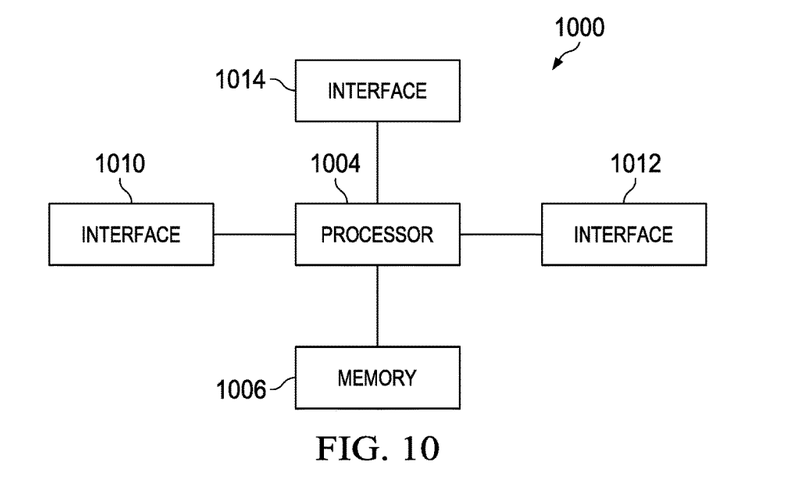
FIG. 10 is a block diagram of an embodiment processing system.

FIG. 10 is a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
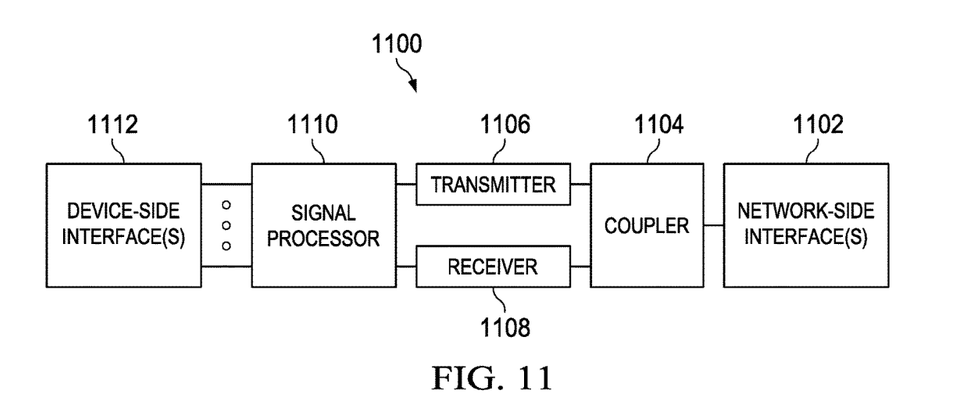
FIG. 11 is a block diagram of an embodiment transceiver.

In some embodiments, one or more of the interfaces 1010, 1012, 1014 connects the processing system 1000 to a transceiver adapted to transmit and receive signaling over the telecommunications network. FIG. 11 is a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an estimating unit/module, a listening unit/module, a determining unit/module, a refraining unit/module, and/or a performing unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for channel reservation and communication using carrier sense multiple access (CSMA) with directional antennas in a wireless network, the method comprising:
   receiving, by a destination station using an omnidirectional antenna pattern, a directional request to send (RTS) frame from a source station, the directional RTS frame indicating that the directional RTS frame is a directional frame;
   transmitting, by the destination station, a transmit network allocation vector (TNAV) frame in response to receipt of the directional RTS frame, the TNAV frame informing receiving stations of the TNAV frame that the destination station will not listen to transmissions for a predefined period of time, wherein the predefined period of time includes a channel quality measurement (CQM) period, and wherein the TNAV frame is communicated in an omnidirectional transmission;
   estimating, by the destination station using a directional antenna pattern after transmitting the TNAV frame, a quality of a channel between the destination station and the source station during the CQM period; and
   transmitting, by the destination station, a directional clear-to-send (CTS) frame corresponding to the directional RTS frame to the source station upon determining that the estimated quality of the channel satisfies a criterion.

2. The method of claim 1, wherein the TNAV frame is further communicated in a series of directional transmissions, the series of directional transmissions being communicated in different directions.

3. The method of claim 2, wherein the series of directional transmissions are communicated in different sectors of a coverage area of the destination station.

4. The method of claim 1, wherein the directional RTS frame is a beam-formed transmission that is received by the destination station using an omnidirectional antenna pattern.

5. The method of claim 4, further comprising:
   receiving, by the destination station, a directional data transmission from the source station after sending the directional CTS frame to the source station, the directional data transmission being a beam-formed data transmission that is received by the destination station using a directional antenna pattern.

6. The method of claim 5, further comprising:
   sending a directional acknowledgment (ACK) message to the source station upon receiving the directional data transmission.

7. The method of claim 4, wherein estimating the quality of the channel between the destination station and the source station comprises:
   determining a received signal power of the directional RTS frame, the directional RTS frame having been received prior to the CQM period;
   listening, by the destination station, for interference using a directional antenna pattern during the CQM period; and
   estimating the quality of the channel according to the received signal power of the directional RTS frame received prior to the CQM period and the interference measured during the CQM period.

8. The method of claim 1, wherein the TNAV frame instructs the source station not to perform transmissions toward the destination station until either the directional CTS frame is received or a TNAV frame period expires.

9. The method of claim 1, wherein the estimated quality of the channel satisfies the criterion when the estimated quality of the channel exceeds a signal to noise (SNR) threshold.

10. The method of claim 1, wherein the TNAV frame is further communicated in a directional transmission.

11. A method for spatial reuse in carrier sense multiple access (CSMA) with directional antennas in a wireless network, the method comprising
receiving, by a station, a transmit network allocation vector (TNAV) frame from a destination station, the TNAV frame being transmitted by the destination station in an omnidirectional transmission, and the TNAV frame identifying the destination station and identifying a directional network allocation vector (NAV) period, wherein the TNAV frame informs the station that the destination station will not listen to transmissions during the NAV period;
refraining, by the station in response to receipt of the TNAV frame, from performing directional transmissions in a transmit direction associated with the destination station for a duration of the directional NAV period; and
estimating, by the station, channel quality between the station and the destination station based on a received signal power of the TNAV frame.

12. The method of claim 11, further comprising transmitting a directional signal in a direction other than the transmit direction associated with the destination station during the directional NAV period.

13. The method of claim 12, wherein the destination station is an access point (AP), and wherein the directional signal is transmitted to a neighboring AP of the destination station.

14. The method of claim 11, further comprising:
determining, by the station upon expiration of the directional NAV period, whether to listen to a channel between the station and the destination station omnidirectionally or in the transmit direction associated with the destination station.

15. A method for spatial reuse in carrier sense multiple access (CSMA) with directional antennas in a wireless network, the method comprising:
transmitting, by a source station, a directional request to send (RTS) frame to a destination station, the directional RTS frame comprising an indication identifying the RTS as a directional frame;
receiving, by the source station in response to transmitting the directional RTS frame, a transmit network allocation vector (TNAV) frame from the destination station after transmitting the directional RTS frame, the TNAV frame informing the source station that the destination station will not listen to transmissions for a period of time, and the period of time including a channel quality measurement (CQM) period, wherein the TNAV frame is communicated in an omnidirectional transmission;
receiving, by the source station after receiving the TNAV frame, a directional clear-to-send (CTS) frame from the destination station in response to transmission of the directional RTS frame, the period of time expiring upon receipt of the directional CTS frame; and
performing a directional data transmission to the destination station upon receipt of the directional CTS frame in response to determining that a criterion is satisfied.

16. The method of claim 15, wherein the directional RTS frame is a beam-formed transmission that is received by the destination station using an omnidirectional antenna pattern.

17. The method of claim 15, wherein the directional data transmission is a beam-formed data transmission that is received by the destination station using a directional antenna pattern.

18. The method of claim 15, further comprising receiving a directional acknowledgment (ACK) message from the destination station after the destination station receives the directional data transmission.

19. The method of claim 15, further comprising estimating, by the source station, quality of a channel between the destination station and the source station during the CQM period based on the TNAV frame.

20. The method of claim 19, wherein the directional data transmission is transmitted to the destination station in response to determination that the estimated quality of the channel exceeds a signal to noise (SNR) threshold.

21. The method of claim 19, wherein estimating the quality of the channel between the destination station and the source station comprises:
determining a received signal power of the TNAV frame, the TNAV frame having been received prior to the CQM period;
listening, by the source station, for interference using a directional antenna pattern during the CQM period; and
estimating the quality of the channel according to a ratio between the received signal power of the TNAV frame received prior to the CQM period and the interference measured during the CQM period.

22. The method of claim 15, wherein the TNAV frame instructs the source station not to perform transmissions toward the destination station until either the directional CTS frame is received or a TNAV frame period expires.

23. A destination station in a wireless network, the destination station comprising:
a transceiver coupled to one or more directional antennas, with the transceiver configured to perform carrier sense multiple access (CSMA) communications;
a non-transitory memory storage comprising instructions; and
one or more processors in communication with the transceiver and the non-transitory memory storage, wherein the one or more processors execute the instructions to:
receive, in an omnidirectional antenna pattern, a directional request to send (RTS) frame from a source station, the directional RTS frame indicating that the directional RTS frame is a directional frame and a data transmission is to be performed by the source station to the destination station;
transmit a transmit network allocation vector (TNAV) frame in response to receipt of the directional RTS frame, the TNAV frame informing receiving stations of the TNAV frame that the destination station will not listen to transmissions for a predefined period of time, with the predefined period of time expiring at the end of transmission of a directional clear-to-send (CTS) frame by the destination station in response to the directional RTS frame, wherein the predefined period of time includes a channel quality measurement (CQM) period, and wherein the TNAV frame is communicated in an omnidirectional transmission;

estimate, using a directional antenna pattern after transmitting the TNAV frame and before transmitting the directional CTS frame, a quality of a channel between the destination station and the source station during the CQM period; and transmit the directional clear-to-send (CTS) frame to the source station acknowledging receipt of the directional RTS frame upon determining that the estimated quality of the channel satisfies a criterion.

* * * * *